(12) United States Patent
Oda

(10) Patent No.: US 8,991,452 B2
(45) Date of Patent: Mar. 31, 2015

(54) PNEUMATIC TIRE

(71) Applicant: Sumitomo Rubber Industries, Ltd., Kobe-shi, Hyogo (JP)

(72) Inventor: Ryo Oda, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 155 days.

(21) Appl. No.: 13/718,681

(22) Filed: Dec. 18, 2012

(65) Prior Publication Data

US 2013/0167996 A1 Jul. 4, 2013

(30) Foreign Application Priority Data

Dec. 29, 2011 (JP) .................................. 2011-290325

(51) Int. Cl.

| B60C 11/12 | (2006.01) |
|---|---|
| B60C 11/04 | (2006.01) |
| B60C 11/03 | (2006.01) |
| B60C 11/13 | (2006.01) |

(52) U.S. Cl.
CPC ................. *B60C 11/04* (2013.01); *B60C 11/12* (2013.01); *B60C 11/0306* (2013.04); *B60C 11/1369* (2013.04); *B60C 11/1236* (2013.04); *B60C 2011/1254* (2013.04); *B60C 2011/0383* (2013.04); *B60C 2011/0381* (2013.04); *B60C 2011/0372* (2013.04); *B60C 2011/0395* (2013.04)
USPC ............. 152/209.18; 152/209.16; 152/209.27

(58) Field of Classification Search
CPC  B60C 11/0306; B60C 11/12; B60C 11/1236; B60C 2011/0339; B60C 2011/0348; B60C 2011/0344; B60C 2011/0358; B60C 2011/036; B60C 2011/0372; B60C 2011/0374; B60C 2011/0381; B60C 2011/0383; B60C 2011/1236; B60C 2011/1254
USPC ............... 152/209.1, 209.16, 209.18, 209.27; D12/525–532, 557–567, 592–603
See application file for complete search history.

(56) References Cited

U.S. PATENT DOCUMENTS

| D378,075 S | * | 2/1997 | Hashimoto et al. | .......... D12/567 |
|---|---|---|---|---|
| D388,381 S | * | 12/1997 | Heinen et al. | ................ D12/567 |
| D397,971 S | * | 9/1998 | Horie et al. | .................. D12/597 |
| D451,444 S | * | 12/2001 | Heinen et al. | ................ D12/531 |
| D512,960 S | * | 12/2005 | Graas et al. | .................. D12/561 |
| D515,020 S | * | 2/2006 | Fukunaga | ..................... D12/521 |
| D515,023 S | * | 2/2006 | Fukunaga | ..................... D12/567 |
| D656,893 S | * | 4/2012 | Kiwaki | ........................ D12/594 |
| 2002/0011291 A1 | | 1/2002 | Ikeda | |
| 2011/0297284 A1 | * | 12/2011 | Montesello et al. | ........ 152/209.8 |

FOREIGN PATENT DOCUMENTS

JP 2001-206020 A 7/2001

\* cited by examiner

*Primary Examiner* — Eric Hug
(74) *Attorney, Agent, or Firm* — Birch, Stewart, Kolasch & Birch, LLP

(57) ABSTRACT

A pneumatic tire includes a tread having a center main groove and a pair of shoulder main grooves, a pair of center portions between the center main groove and the shoulder main grooves, and a pair of shoulder portions between the shoulder main groove and tread edges. Each center portion includes: center lateral grooves extending from the shoulder main groove toward the axially inside of the tire without reaching the center main groove so as to have an axially inner end thereof on the center portion with an angle of 35 to 65 degrees with respect to an axial direction of the tire; center lateral sipes extending from axially inner ends of the center lateral grooves to the center main groove in the same inclination direction as the center lateral groove at an angle of 35 to 65 degrees with respect to an axial direction of the tire.

6 Claims, 5 Drawing Sheets

US 8,991,452 B2

PNEUMATIC TIRE

BACKGROUND OF THE INVENTION

1. Field of the Invention

The present invention relates to a pneumatic tire in which the braking performance on wet road can be improved while maintaining the steering stability and wear resistance.

2. Description of the Related Art

Pneumatic tires having block patterns with a plurality of blocks on the tread portion are well known. Recent years, many users request so that these tires have an improvement wet performance. In order to improve the braking performance on wet road, a tire having a main groove which extends in a circumferential direction of the tire and a lateral groove which extends from the tire equator to the tread edge each of which has a wide groove width and/or groove depth is proposed.

However, since such a tire described above is liable to have decreased rigidity of tread blocks, the wear resistance and the steering stability of the tire tends to deteriorate. Therefore, it was difficult to improve the braking performance on wet road without decreasing the wear resistance and the steering stability of tires.

SUMMARY OF THE INVENTION

The present invention has been worked out in light of the circumstances described above, and has a main object of providing a pneumatic tire in which the braking performance on wet road can be improved while maintaining the steering stability and wear resistance.

In accordance with the present invention, there is provided a pneumatic tire comprising a tread portion provided with a circumferentially extending center main groove and a pair of circumferentially extending shoulder main grooves disposed axially outside the center groove, a pair of center portions each of which is between the center main groove and the shoulder main groove, a pair of shoulder portions each of which is between the shoulder main groove and a tread edge, wherein each said center portion is provided with: a plurality of center lateral grooves each of which extends from the shoulder main groove toward the axially inside of the tire without reaching the center main groove so as to have an axially inner end thereof on the center portion, and has an angle of from 35 to 65 degrees with respect to an axial direction of the tire; a plurality of center lateral sipes each of which extends from the axially inner end of the center lateral groove to the center main groove and has the same inclination direction with the center lateral groove having an angle of from 35 to 65 degrees with respect to an axial direction of the tire; and a center longitudinal sipe which connects between circumferentially adjacent center lateral grooves and is separated from an axially inner edge of the center portion in a first axial distance in a range of from 20 to 40% of a width of the center portion.

DETAILED DESCRIPTION

An embodiment of the present invention will be explained below with reference to the accompanying drawings.

Figure 1:
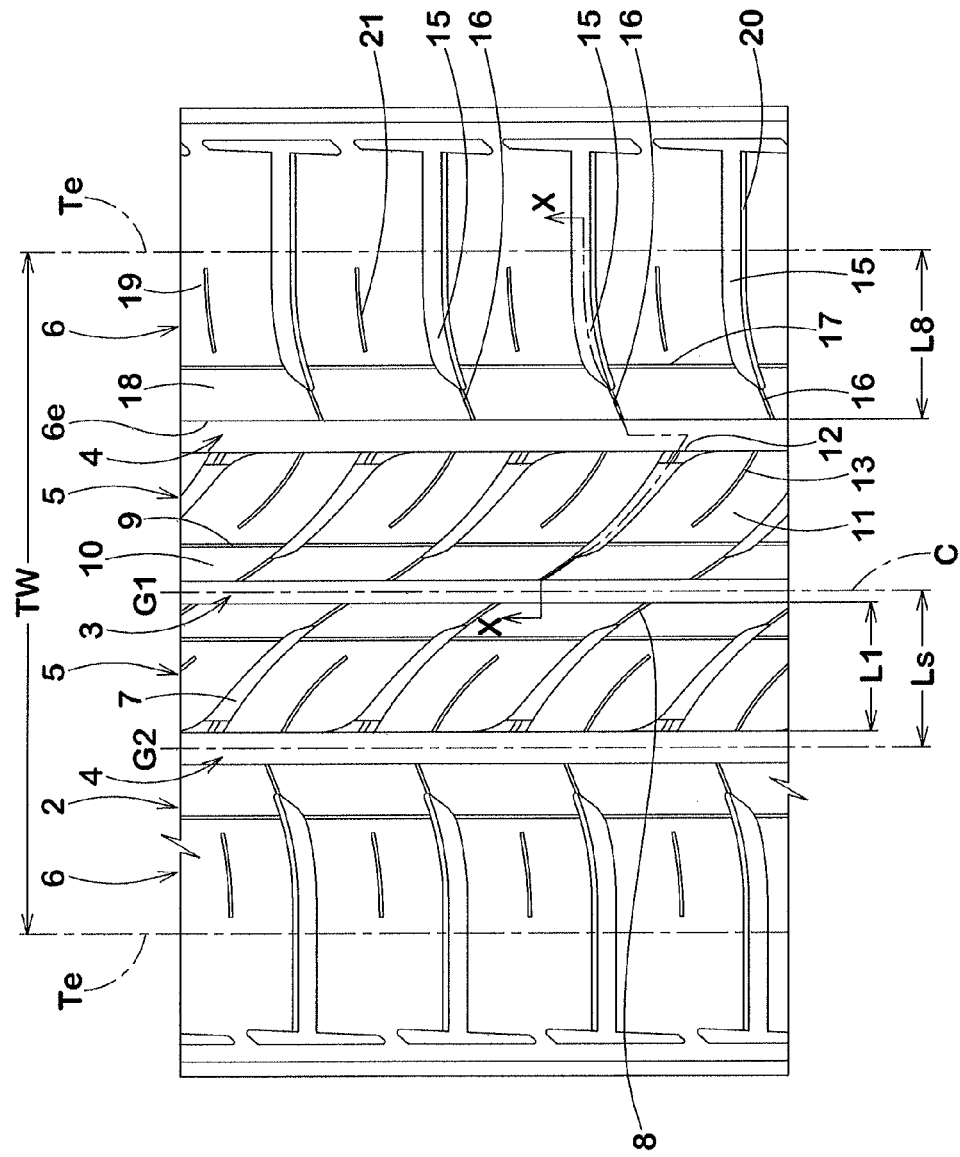
FIG. 1 is a development view of a tread portion of a pneumatic tire showing an embodiment of the present invention.

Referring to FIG. 1, a pneumatic tire (hereinafter it may simply be referred as "the tire") 1 in accordance with the present invention, which is suitably used for a passenger car, has a tread portion 2 being provided with at least one circumferentially extending center main groove 3 (one in this embodiment) and a pair of circumferentially extending shoulder main groove 4, 4 disposed axially outside the center main groove 3. Hence, the tread portion 2 is divided into a pair of center portions 5 between the center main groove 3 and shoulder main grooves 4, and a pair of shoulder portions 6 between shoulder main grooves 4 and tread edges Te.

Here, tread edges Te are the axial outermost edges of the ground contacting patch which occurs under a normally inflated loaded condition when the camber angle of the tire is zero. The tread edges Te define the tread width TW therebetween.

The normally inflated loaded condition is such that the tire is mounted on a standard wheel rim and inflated to a standard pressure and loaded with a standard tire load.

The standard wheel rim is a wheel rim officially approved or recommended for the tire by standards organizations, the standard wheel rim is the "standard rim" specified in JATMA, the "Measuring Rim" in ETRTO, the "Design Rim" in TRA or the like, for example.

The standard pressure is the "maximum air pressure" in JATMA, the "Inflation Pressure" in ETRTO, and the maximum pressure given in the "Tire Load Limits at Various cold Inflation Pressures" table in TRA or the like. In case of passenger car tires, however, the standard pressure is uniformly defined by 180 kPa.

The standard tire load is the "maximum load capacity" in JATMA, the "Load Capacity" in ETRTO, and the maximum value given in the above-mentioned table in TRA or the like. In case of passenger car tires, however, the standard tire load is uniformly defined by 88% of the maximum tire load.

In this application including specification and claims, various dimensions, positions and the like of the tire refer to those under a normally inflated unloaded condition of the tire unless otherwise noted. The normally inflated unloaded condition is such that the tire is mounted on the standard wheel rim and is inflated to the standard pressure but loaded with no tire load.

Each of the center main groove 3 and shoulder main grooves 4 is preferably formed as a straight groove extending along the tire circumferential direction to improve the steering stability by preventing the wobble at braking and or the like.

Figure 2:
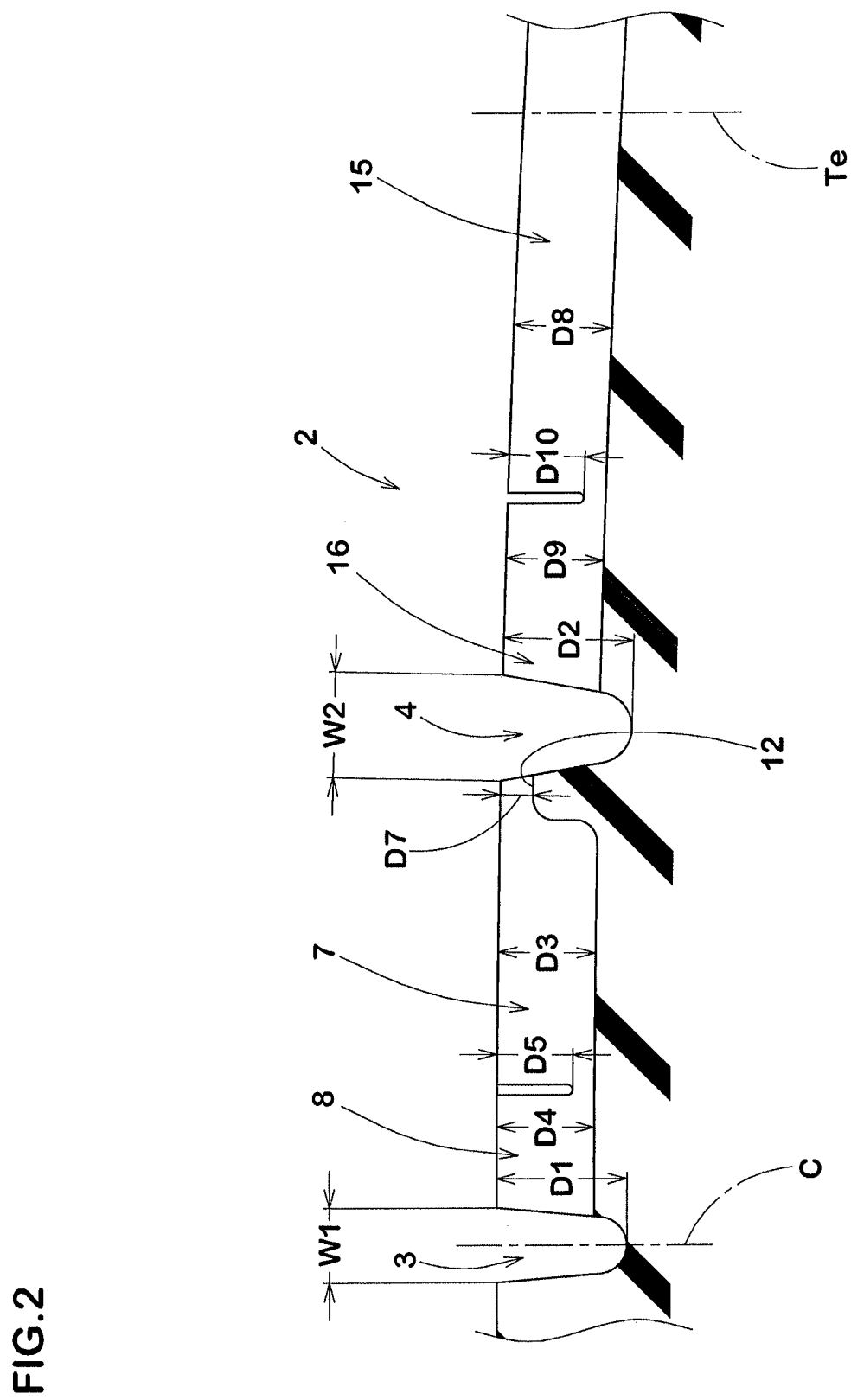
FIG. 2 is a cross sectional view taken along the line X-X of FIG. 1.

In order to maintain the drainage performance and the rigidity of the tread portion 2, the groove width W1 of the center main groove 3, for example, is preferably in a range of from 2.5 to 4.5% of the tread width TW, and the groove width W2 of the shoulder main groove 4 is preferably in a range of from 4.0 to 7.0% of the tread width TW. As shown in FIG. 2, the groove depths D1 and D1 of the center and shoulder main grooves 3 and 4, for example, are preferably in a range of from 6.0 to 9.0 mm. These main grooves 3 and 4 may be formed as a zigzag or wave like manner.

The locations of the center main groove 3 and shoulder main grooves 4 are not particularly limited. When one center main groove 3 is provided on the tread portion 2, the center-line G1 of the main groove 3 is preferably provided on the tire equator C. As for the shoulder main grooves 4, the centerlines G2 thereof are preferably separated from the tire equator C at an axial distance Ls of not less than 15% of the tread width TW, and more preferably not less than 20% of the tread width TW. Moreover, the axial distance Ls is preferably not more than 30% of the tread width TW, and more preferably not more than 25% of the tread width TW.

Figure 3:
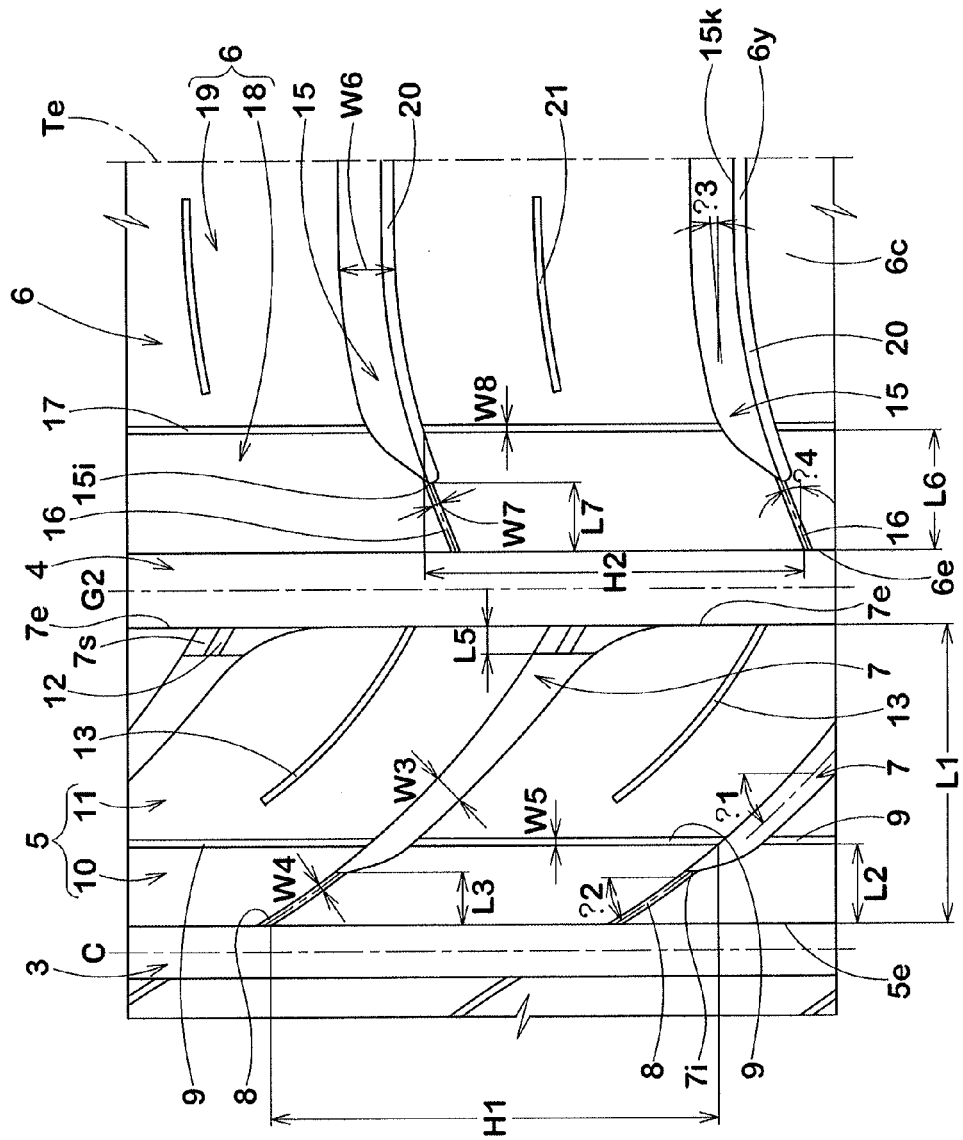
FIG. 3 is a partial enlarged view of FIG. 1.

Referring to FIG. 3, the center portion 5 is provided with a plurality of center lateral grooves 7 and a plurality of center lateral sipes 8.

Each center lateral groove 7 extends from the shoulder main groove 4 toward the tire equator C without reaching the center main groove 3 so as to have an axially inner end 7i thereof on the center portion 5. Also, the center lateral groove 7 has an angle θ1 of from 35 to 65 degrees with respect to an axial direction of the tire.

Each center lateral sipe 8 extends from the axially inner end 7i of the center lateral groove 7 to the center main groove 3 and has the same inclination direction with the center lateral groove 7 having an angle θ2 of from 35 to 65 degrees with respect to an axial direction of the tire.

The center portion 5 is also provided with a center longitudinal sipe 9 which connects between circumferentially adjacent center lateral grooves 7, 7. The center longitudinal sipe 9 is separated from the axially inner edge 5e of the center portion 5 in a first axial distance L2 in a range of from 20 to 40% of the width L1 of the center portion 5.

Hence, the center portion 5 has a plurality of center inner blocks 10 and a plurality of center outer blocks 11.

Each center inner block 10 is surrounded by the center main groove 3, center longitudinal sipe 9, center lateral sipes 8 and center lateral grooves 7. The center inner block 10 has a longitudinally long parallelogram shape.

Each center outer block 11 is disposed axially outside each center inner block 11 and has a parallelogram shape. In this embodiment, the tread pattern is designed substantially point symmetry about a point on the tire equator C except for variable pitches arrangement.

Such a center portion 5 having center inner and outer blocks 10, 11 has an advantage of improving the rigidity thereof while maintaining the drainage performance of the tire.

Figure 4:
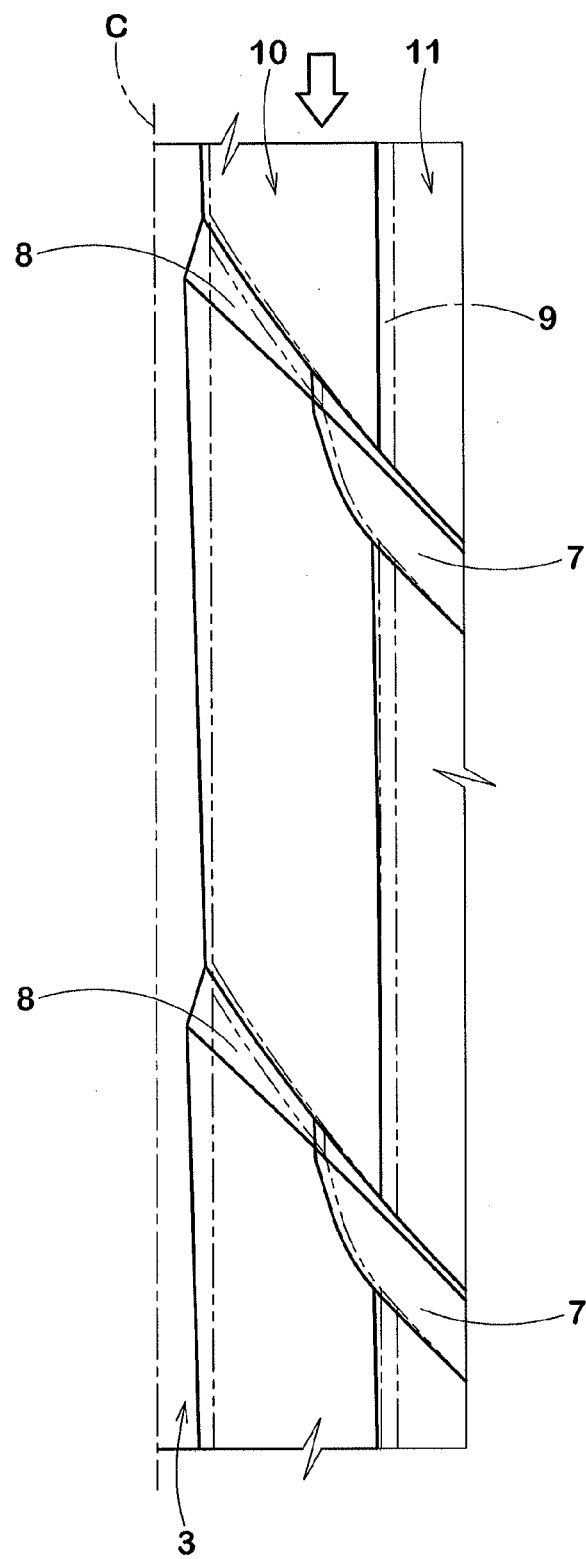
FIG. 4 is a partial enlarged view of the tread portion of FIG. 1 for explaining a deformation thereof.

Moreover, referring to FIG. 4, the center inner block 10 being contacted on the ground is deformed to the axially inside so as to enlarge the sipe width of center lateral sipes 8 and/or center longitudinal sipes 9 at braking, shown as a solid line. Accordingly, the center lateral and longitudinal sipes 8, 9 are capable to improve the drainage performance on wet road at braking. Especially, since the center longitudinal sipe 9 is connected to adjoining center lateral grooves 7 having a large groove width compared to the center lateral sipes 8, large deformation of the center inner block 10 at braking is generated, and thereby further improved braking performance on wet road may be obtained. Also, since the center lateral groove 7 and the center lateral sipe 8 are inclined with the same direction, water film under the tread portion tends to be drained rapidly off through the shoulder main groove 4 by with the rotational force of the tire. Accordingly, the braking performance on wet road may be still further improved.

When the angle θ1 of the center lateral groove 7 is less than 35 degrees or the angle θ2 of the center lateral sipe 8 is less than 35 degrees, the wear resistance and steering stability of the tire are liable to deteriorate due to the small rigidity of the center inner and outer blocks 10, 11. When the angle θ1 or the angle θ2 is more than 65 degrees, the braking performance is liable to deteriorate due to the large rigidity of the center inner block 10. Preferably, the angle θ1 is in a range of from 40 to 60 degrees, and the angle θ2 is in a range of from 37 to 55 degrees, respectively.

The angle θ1 of the center lateral groove 7 and the angle θ2 of the center lateral sipe 8 may be constant, or increasing toward the axially outside of the tire to further improve the steering stability of the tire. Such a construction for angles of the center lateral groove 7 or sipe 8 may be utilized for the other lateral grooves and/or sipes.

The center longitudinal sipe 9 is separated from the axially inner edge 5e of the center portion 5 in a first axial distance L2 in a range of from 20 to 40% of a width L1 of the center portion 5. When the first axial distance L2 is less than 20% of the width L1 of the center portion 5, the lateral rigidity of the center inner block 10 is liable to decrease, and thereby the wear resistance thereof tends to deteriorate. When the first axial distance L2 is more than 40% of the width L1 of the center portion 5, the deformation of the center inner block 10 at braking is not satisfactory, and thereby the braking performance on wet road may be deteriorated. Preferably, the first distance L2 is in a range of from 25 to 35% of the width L1 of the center portion 5.

In order to maintain the drainage performance and the steering stability of the tire, groove width W3 of the center lateral groove 7 is preferably not less than 1.5 mm, more preferably not less than 2.0 mm, preferably not more than 6.0 mm, and more preferably not more than 5.0 mm. Similarly, the groove depths D3 of the center lateral groove 7 is preferably not less than 3.0 mm, more preferably not less than 4.0 mm, preferably not more than 7.0 mm, and more preferably not more than 6.0 mm.

Although the sipe width W4 is set smaller than the groove width W3 of the center lateral groove 7, in order to further improve the braking performance on wet road and the wear resistance of the tire, sipe width W4 of the center lateral sipe 8 is preferably not less than 0.4 mm, more preferably not less than 0.5 mm, preferably not more than 1.5 mm, and more preferably not more than 1.2 mm. Similarly, the sipe depths D4 of the center lateral sipe 8 is preferably not less than 1.0 mm, more preferably not less than 2.0 mm, preferably not more than 6.5 mm, and more preferably not more than 6.0 mm.

In order to further improve the braking performance on wet road, the axial length L3 of the center lateral sipe 8 is preferably not less than 0.10 times, more preferably not less than 0.15 times, preferably not more than 0.25 times, and more preferably not more than 0.20 times the width L1 of the center portion 5.

In order to further improve the rigidity of the center portion 5 and the braking performance on wet road, the sipe width W5 of the center longitudinal sipe 9 is preferably not less than 0.5 mm, more preferably not less than 0.6 mm, preferably not more than 2.0 mm, and more preferably not more than 1.5 mm. Similarly, the sipe depths D5 of the center longitudinal sipe 9 is preferably not less than 2.0 mm, more preferably not less than 3.0 mm, preferably not more than 6.5 mm, and more preferably not more than 6.0 mm.

Preferably, each inner center block 10 has an aspect ratio H1/L2 of a circumferentially maximum length H1 thereof to an axial width L2 thereof in a range of from 3.0 to 7.0 to further improve the braking performance on wet road. Especially, aspect ratio H1/L2 is more preferably in a range of from 3.5 to 6.5.

The center lateral groove 7 is provided with a tie-bar 12 in which a groove bottom 7s protrudes toward the radially outside of the tire so as to reduce the groove depth to improve rigidity of the center portion 5. The tie-bar 9, for example, is provided at the axially outer portion 7e of the center lateral groove 7. The groove depth D7 of the center lateral groove 7 at the tie-bar 12 (shown in FIG. 2) is preferably not less than 40%, more preferably not less than 50%, preferably not more than 80% and more preferably not more than 70% of the groove depth D3 of the center lateral groove 7 to improve the drainage performance and the rigidity of the center portion 5.

In order to further improve the effect described above, the axial length L5 of the tie-bar 12 is preferably not less than 5%, more preferably not less than 7%, preferably not more than 20% and more preferably not more than 15% the axial width L1 of the center portion 5.

The center outer block 11 is provided with a center outer sipe 13 which extends from the shoulder main groove 4 to the axially inside without reaching the center longitudinal sipe 9. Such a center outer sipe 13 may maintain the steering stability and the wear resistance of the tire while maintaining the rigidity of the center outer block 11.

The shoulder portion 6 is provided with a plurality of shoulder lateral grooves 15 and a plurality of shoulder lateral sipes 16.

Each of shoulder lateral grooves 15 extends from the axially outside the tread edge Te to the axially inside of the tire without reaching the shoulder main groove 4 so as to have an axially inner end 15i thereof on the shoulder portion 6. The shoulder lateral groove 15 has an angle θ3 of from less than 25 degrees with respect to the axial direction of the tire.

Each of shoulder lateral sipes 16 extends from the axially inner end 15i of the shoulder lateral groove 15 to the shoulder main groove 4 and has the same inclination direction with the shoulder lateral groove 15.

The shoulder portion is also provided with a shoulder longitudinal sipe 17 which connects between circumferentially adjacent shoulder lateral grooves 15, 15. The shoulder longitudinal sipe 17 is separated from the axially inner edge 6e of the shoulder portion 6 in a second axial distance L6 larger than the first axial distance L2.

Hence, the shoulder portion 6 includes: a plurality of shoulder inner blocks 18 which are divided by the shoulder main groove 4, shoulder longitudinal sipe 17, shoulder lateral sipes 18 and shoulder lateral grooves 15; and a plurality of shoulder outer blocks 18 which are disposed axially outside the shoulder inner blocks 18 and divided by the tread edge Te, the shoulder longitudinal sipe 17 and shoulder lateral grooves 15.

Preferably, each inner shoulder block 18 has an aspect ratio H2/L6 of its circumferentially maximum length H2 to an axial width L6 thereof smaller than the aspect ratio H1/L2 of the center inner block 10. When the aspect ratio H2/L6 of the inner shoulder block 18 is larger than the aspect ratio H1/L2 of the center inner block 10, the steering stability and wear resistance of the tire are liable to decrease due to the decreased lateral rigidity of the shoulder portion 6. Preferably, the aspect ratio H2/L6 of the inner shoulder block 18 is not less than 2.0, more preferably not less than 2.5, preferably not more than 6.0, and more preferably not more than 5.5.

Preferably, in order to maintain the rigidity of the shoulder portion 6, the shoulder lateral groove 15 and shoulder lateral sipe 16 have angles θ3 and θ4 with respect to the tire axial direction not more than 25 degrees, more preferably not more than 20 degrees, respectively.

In order to maintain the drainage performance and the rigidity of the shoulder portion 6, groove width W6 of the shoulder lateral groove 15 is preferably not less than 2.0 mm, more preferably not less than 2.5 mm, preferably not more than 6.0 mm, and more preferably not more than 5.0 mm. Similarly, the groove depths D8 (shown in FIG. 2) of the shoulder lateral groove 15 is preferably not less than 4.0 mm, more preferably not less than 5.0 mm, preferably not more than 7.5 mm, and more preferably not more than 6.5 mm.

In order to further improve the braking performance on wet road and the rigidity of the shoulder portion 6, sipe width W7 of the shoulder lateral sipe 16 is preferably not less than 0.4 mm, more preferably not less than 0.5 mm, preferably not more than 1.5 mm, and more preferably not more than 1.2 mm. Similarly, the sipe depths D9 (shown in FIG. 2) of the shoulder lateral sipe 16 is preferably not less than 1.0 mm, more preferably not less than 2.0 mm, preferably not more than 6.5 mm, and more preferably not more than 6.0 mm.

In order to further improve the braking performance on wet road and the rigidity of the shoulder portion 6, the axial length L7 of the shoulder lateral sipe 16 is preferably not less than 0.10 times, more preferably not less than 0.15 times, preferably not more than 0.25 times, and more preferably not more than 0.20 times the axial width L8 of the shoulder portion 6.

In order to further improve the braking performance on wet road and the rigidity of the shoulder portion 6, the sipe width W8 of the shoulder longitudinal sipe 17 is preferably not less than 0.5 mm, more preferably not less than 0.6 mm, preferably not more than 2.0 mm, and more preferably not more than 1.5 mm. Similarly, the sipe depth D10 (shown in FIG. 2) is preferably not less than 2.0 mm, more preferably not less than 3.0 mm, preferably not more than 6.5 mm, and more preferably not more than 6.0 mm.

The shoulder lateral groove 15 is preferably provided with a chamfer portion 20 on the top of one groove wall 15k. Namely, the chamfer portion 20 is provided at a corner between the groove wall 15k and a ground-contacting surface of the shoulder portion 6 to improve the steering stability and the wear resistance the rigidity of the shoulder portion 6.

The shoulder outer block 19 is preferably provided with a shoulder outer sipe 21 which extends in parallel with the shoulder lateral groove 15 and has both ends terminating within the shoulder outer block 19. Such a shoulder outer sipe 21 reduces the rigidity of the shoulder outer block 19 to keep in well balance with the shoulder inner block 18. In other aspect, the axially outer end of the shoulder outer sipe 19 may reach the tread edge Te.

The present invention is more specifically described and explained by means of the following Examples and References. It is to be understood that the present invention is not limited to these Examples.

Comparison Test

Pneumatic tires (size: 175/65R15) with basic tread patterns of FIG. 1 except for details shown in Table 1 were made and tested. Major common specifics and test method are as follows.

Rim size: 15×5J
Tread width TW: 130 mm
Center main groove
   Groove width W1/Tread width TW: 3.2%
   Groove depth D1: 7.4 mm
Shoulder main groove
   Groove width W2/Tread width TW: 5.5%
   Groove depth D2: 7.4 mm
Center lateral groove
   Groove width W3: 2.0 to 3.0 mm
   Groove depth D3: 5.2 mm
Center lateral sipe
   Sipe width W4: 0.6 mm
   Sipe depth D4: 5.0 mm
Center longitudinal sipe
   Sipe depth D5: 5.0 mm Shoulder lateral groove
　　Groove width W6: 4.0 mm
　　Groove depth D8: 6.0 mm
　　Angle θ3: 0 to 15 degrees
Shoulder lateral sipe
　　Sipe width W7: 0.6 mm
　　Sipe depth D9: 5.0 mm
　　Angle θ4: 15 degrees
Shoulder longitudinal sipe
　　Sipe width W8: 0.8 mm
　　Sipe depth D10: 5.0 mm
Tie-bar
　　Ratio L5/L1: 10%
　　Ratio D7/D3: 6.5%
Others
　　Aspect ratio H2/L6: 4.0

Cornering Power Test:

The cornering force under the slip angle of plus/minus 1 degrees of each test tire was measured using indoor tester, and then the each cornering power CP of test tires was calculated using the following formula:

$$CP = \{CF(+1\ deg.) - CF(-1\ deg.)\}/2.$$

Where, "CF(+1 deg.)" means the cornering force at slip angle of plus 1 degrees, and "CF(−1 deg.)" means the cornering force at slip angle of minus 1 degrees.

Steering Stability Test:

The test tires were mounted on wheel rims of 15×5J with an inner pressure of 200 kPa, and installed in a vehicle (Japanese FF car with a displacement of 1,500 cc) as four wheels. Then, a test driver drove the test car on a test course having a dry asphalt road, and evaluated steering stability such as the steering response during cornering, stiffness and cornering grip. The results are shown with a score of 100 representing a value in reference 1. The larger the value, the better the performance.

Wear Resistance Test:

The test car described above was run for 3,000 km on both local streets and a speedway, and then the groove depths left in each center and shoulder grooves of tires were measured. The groove depths were measured at ten points in tire circumferential direction in each groove, and the depth difference between the center main groove and the shoulder main groove in each measurement point was calculated, and the reciprocal number thereof was evaluated. The results are shown with an index of 100 representing a value in reference 1. The larger the value, the better the performance.

Running Noise Test:

The test car described above was run on a smooth asphalt road at a speed of from 70 to 120 km/hr. During running, the test driver evaluated the noise heard inside the car into hundred ranks. The higher the rank number, the better the noise.

Braking Performance on Wet Road Test:

The test car described above was run on a wet asphalt road with 5 mm depth of water and suddenly braked at a speed of 50 km/hr so as to lock each tire. The braking distance of each test tire was measured. The results are shown with an index of 100 representing a value in reference 1. The larger the value, the better the performance.

TABLE 1

Figure 5:
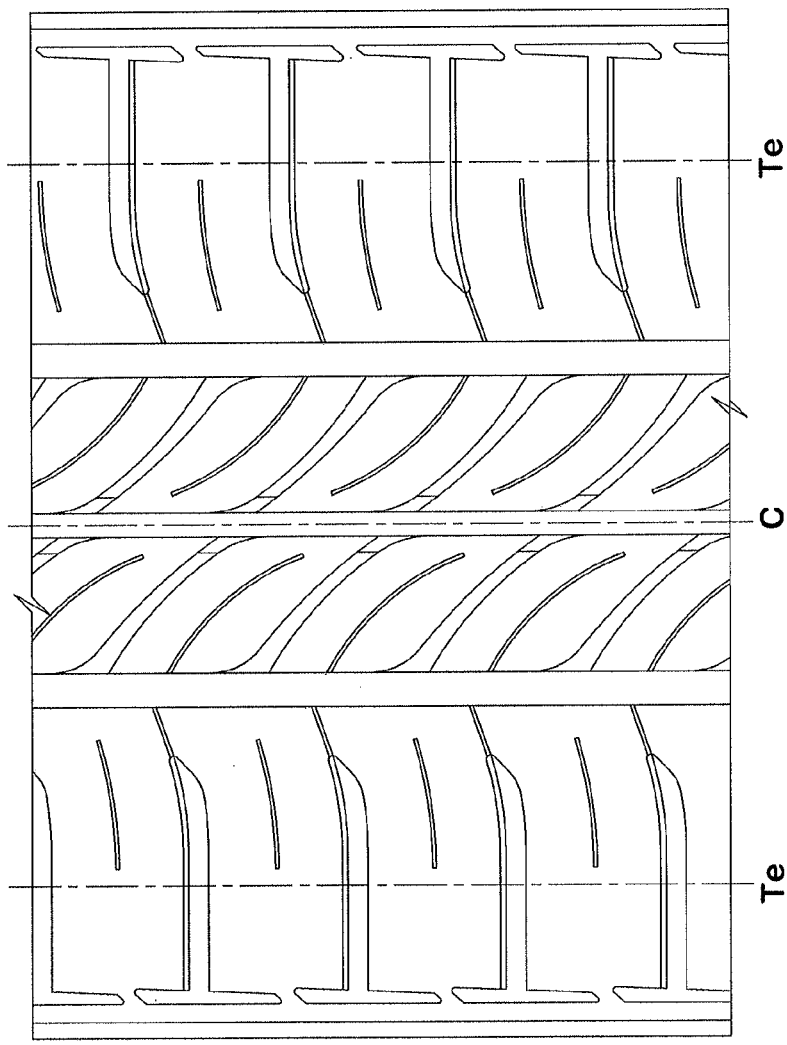
FIG. 5 is a development view showing a tread portion of a reference.

|  | Ref. 1 | Ref. 2 | Ex. 1 | Ex. 2 | Ref. 3 | Ref. 4 | Ex. 3 | Ex. 4 | Ex. 5 |
| --- | --- | --- | --- | --- | --- | --- | --- | --- | --- |
| Tread pattern | FIG. 5 | FIG. 1 | FIG. 1 | FIG. 1 | FIG. 1 | FIG. 1 | FIG. 1 | FIG. 1 | FIG. 1 |
| Angle θ2 of center lateral sipe (deg.) | 45 | 30 | 35 | 65 | 70 | 45 | 45 | 45 | 45 |
| Ratio L2/L1 (%) | — | 30 | 30 | 30 | 30 | 10 | 20 | 30 | 40 |
| Ratio L3/L1 (%) | — | 17 | 17 | 17 | 17 | 17 | 17 | 17 | 17 |
| Width W5 of center longitudinal sipe (mm) | — | 0.8 | 0.8 | 0.8 | 0.8 | 0.8 | 0.8 | 0.8 | 0.8 |
| Aspect ratio H1/L2 | — | 5 | 5 | 5 | 5 | 5 | 5 | 5 | 5 |
| Cornering power (Index) | 100 | 98 | 100 | 100 | 100 | 98 | 100 | 100 | 100 |
| Steering stability (Index) | 100 | 95 | 100 | 110 | 110 | 100 | 105 | 110 | 105 |
| Wear resistance (Index) | 100 | 90 | 100 | 105 | 105 | 90 | 100 | 100 | 100 |
| Running noise (Rank) | 100 | 110 | 110 | 110 | 105 | 110 | 110 | 110 | 110 |
| Wet Braking performance (Index) | 100 | 105 | 110 | 105 | 90 | 110 | 112 | 115 | 105 |

|  | Ref. 5 | Ex. 6 | Ex. 7 | Ex. 8 | Ex. 9 | Ex. 10 | Ex. 11 | Ex. 12 | Ex. 13 |
| --- | --- | --- | --- | --- | --- | --- | --- | --- | --- |
| Tread pattern | FIG. 1 | FIG. 1 | FIG. 1 | FIG. 1 | FIG. 1 | FIG. 1 | FIG. 1 | FIG. 1 | FIG. 1 |
| Angle θ2 of center lateral sipe (deg.) | 45 | 45 | 45 | 45 | 45 | 45 | 45 | 45 | 45 |
| Ratio L2/L1 (%) | 50 | 25 | 25 | 25 | 25 | 25 | 25 | 25 | 25 |
| Ratio L3/L1 (%) | 17 | 10 | 25 | 17 | 17 | 17 | 17 | 17 | 17 |
| Width W5 of center longitudinal sipe (mm) | 0.8 | 0.8 | 0.8 | 0.6 | 1.5 | 1.5 | 1.5 | 1.5 | 1.5 |
| Aspect ratio H1/L2 | 5 | 5 | 5 | 5 | 5 | 3 | 3.5 | 6.5 | 7 |
| Cornering power (Index) | 100 | 98 | 102 | 100 | 98 | 100 | 100 | 98 | 98 |
| Steering stability (Index) | 105 | 102 | 105 | 110 | 100 | 103 | 106 | 108 | 102 |
| Wear resistance (Index) | 100 | 96 | 100 | 100 | 98 | 105 | 103 | 100 | 96 |
| Running noise (Rank) | 110 | 106 | 112 | 112 | 105 | 110 | 110 | 107 | 106 |
| Wet Braking performance (Index) | 90 | 118 | 105 | 102 | 120 | 100 | 102 | 115 | 118 |

From the test results, it was confirmed that example tires in accordance with the present invention can be effectively improved the braking performance on wet road while maintaining steering stability and wear resistance compared to references.

The invention claimed is:

1. A pneumatic tire comprising
a tread portion provided with a circumferentially extending center main groove and a pair of circumferentially extending shoulder main grooves disposed axially outside the center groove to form a pair of center portions each of which is between the center main groove and the shoulder main groove, and
a pair of shoulder portions each of which is between the shoulder main groove and a tread edge,
each said center portion is provided with:
a plurality of center lateral grooves each extending from the shoulder main groove toward the axially inside of the tire without reaching the center main groove so as to have an axially inner end thereof on the center portion, each center lateral groove having an angle of from 35 to 65 degrees with respect to an axial direction of the tire;
a plurality of center lateral sipes each extending from the axially inner end of the center lateral groove to the center main groove, each center lateral sipe having the same inclination direction with the center lateral groove having an angle of from 35 to 65 degrees with respect to an axial direction of the tire; and
a center longitudinal sipe connecting between circumferentially adjacent center lateral grooves, the center longitudinal sipe separated from an axially inner edge of the center portion in a first axial distance in a range of from 20 to 40% of a width of the center portion, and
each said shoulder portion being provided with:
a plurality of shoulder lateral grooves each extending from at least the tread edge to the axially inside of the tire without reaching the shoulder main groove, each shoulder lateral groove having an angle of from less than 25 degrees with respect to the axial direction of the tire; and
a shoulder longitudinal sipe connecting between circumferentially adjacent shoulder lateral grooves, the shoulder longitudinal sipe being separated in a second axial distance larger than the first axial distance from the axially inner edge of the shoulder portion.

2. The tire according to claim 1, wherein
the center portion has a plurality of center inner blocks which are divided by the center main groove, center longitudinal sipe, center lateral sipes and center lateral grooves, and
each center inner block has an aspect ratio of a circumferentially maximum length thereof to an axial width thereof in a range of from 3.0 to 7.0.

3. The tire according to claim 2, wherein
the shoulder portion is provided with a plurality of shoulder lateral sipes, and
each said shoulder lateral sipe extends from an axially inner end of the shoulder lateral groove to the shoulder main groove and has the same inclination direction with the shoulder lateral groove.

4. The tire according to claim 3, wherein
the shoulder portion has a plurality of shoulder inner blocks which are divided by the shoulder main groove, shoulder longitudinal sipe, shoulder lateral sipes and shoulder lateral grooves, and
each shoulder inner block has an aspect ratio of a circumferentially maximum length thereof to an axial width thereof smaller than that of the center inner block.

5. The tire according to claim 1,
wherein the shoulder portion is provided with a plurality of shoulder lateral sipes, and each said shoulder lateral sipe extends from an axially inner end of the shoulder lateral groove to the shoulder main groove and has the same inclination direction with the shoulder lateral groove.

6. A pneumatic tire comprising
a tread portion provided with a circumferentially extending center main groove and a pair of circumferentially extending shoulder main grooves disposed axially outside the center groove,
a pair of center portions each of which is between the center main groove and the shoulder main groove,
a pair of shoulder portions each of which is between the shoulder main groove and a tread edge, wherein
each said center portion is provided with: a plurality of center lateral grooves each of which extends from the shoulder main groove toward the axially inside of the tire without reaching the center main groove so as to have an axially inner end thereof on the center portion, and has an angle of from 35 to 65 degrees with respect to an axial direction of the tire;
a plurality of center lateral sipes each of which extends from the axially inner end of the center lateral groove to the center main groove and has the same inclination direction with the center lateral groove having an angle of from 35 to 65 degrees with respect to an axial direction of the tire; and
a center longitudinal sipe which connects between circumferentially adjacent center lateral grooves and is separated from an axially inner edge of the center portion in a first axial distance in a range of from 20 to 40% of a width of the center portion,
wherein the center portion has a plurality of center inner blocks which are divided by the center main groove, center longitudinal sipe, center lateral sipes and center lateral grooves, and
each center inner block has an aspect ratio of a circumferentially maximum length thereof to an axial width thereof in a range of from 3.0 to 7.0, and
wherein the shoulder portion has a plurality of shoulder inner blocks which are divided by the shoulder main groove, shoulder longitudinal sipe, shoulder lateral sipes and shoulder lateral grooves, and
each shoulder inner block has an aspect ratio of a circumferentially maximum length thereof to an axial width thereof smaller than that of the center inner block.

* * * * *